(12) United States Patent
Natesh

(10) Patent No.: US 10,769,524 B1
(45) Date of Patent: Sep. 8, 2020

(54) NON-BINARY GENDER FILTER

(71) Applicant: A9.com, Inc., Palo Alto, CA (US)

(72) Inventor: Aishwarya Natesh, Mountain View, CA (US)

(73) Assignee: A9.COM, INC., Palo Alto, CA (US)

( * ) Notice: Subject to any disclaimer, the term of this patent is extended or adjusted under 35 U.S.C. 154(b) by 557 days.

(21) Appl. No.: 15/695,936

(22) Filed: Sep. 5, 2017

(51) Int. Cl.
  *G06Q 30/00* (2012.01)
  *G06N 3/08* (2006.01)
  *G06K 9/62* (2006.01)
  *G06F 16/583* (2019.01)
  *G06F 16/903* (2019.01)

(52) U.S. Cl.
  CPC ........... *G06N 3/08* (2013.01); *G06F 16/5838* (2019.01); *G06F 16/90335* (2019.01); *G06K 9/6267* (2013.01); *G06Q 30/00* (2013.01)

(58) Field of Classification Search
  None
  See application file for complete search history.

(56) References Cited

U.S. PATENT DOCUMENTS

2008/0249876 A1* 10/2008 Rice ................... G06Q 30/0212
  705/14.14

\* cited by examiner

*Primary Examiner* — Mila Airapetian
(74) *Attorney, Agent, or Firm* — Hogan Lovells US LLP

(57) ABSTRACT

Various embodiments utilize a machine learning-based approach to filter items, such as apparel items, based on non-binary gender styles. For example, an electronic catalog of apparel items can be assigned gender scores on a gender scale by a neural network trained to determine a gender score of an apparel item based on an image representation of the apparel item. The neural network may be trained on training data that includes images of various apparel items with gender designations. The apparel items in the electronic catalog are assigned a gender score attribute that reflects how masculine or feminine the apparel item may be. As such, the apparel items can be organized (e.g., sorted, filtered, ranked) based on a non-binary gender score in addition to other attributes, such as item type, size, color, brand, etc. Thus, a user can include non-binary gender style as a search or filtering criteria.

20 Claims, 12 Drawing Sheets

NON-BINARY GENDER FILTER

BACKGROUND

With the expanding use of computer networks, such as the Internet, an increasing amount of commerce is conducted electronically. For example, consumers are increasingly utilizing electronic marketplaces to purchase clothing and other apparel items. Countless apparel items are for sale online, and being able to search quickly and efficiently for apparel items is increasingly important, not only for online retailers who wish to sell their products, but for consumers who are looking to find specific apparel items quickly. Generally, users often rely upon search queries or keyword strings that can be used to identify potentially relevant content. In many instances, however, the relevance depends at least in part on the actual query that was submitted, as well as the way in which the potentially relevant content is categorized or identified. There often is no easy way for a user to modify a query to express a desired refinement, and no accurate way for that expression to be implemented so as to locate the content of interest. For example, apparel items in an electronic marketplace are typically categorized by binary gender, and users can only select between a predefined set of men's apparel items and a predefined set of women's apparel items. However, a user's personal style may not be defined in such a binary way.

BRIEF DESCRIPTION OF THE DRAWINGS

Various embodiments in accordance with the present disclosure will be described with reference to the drawings, in which.

DETAILED DESCRIPTION

Figure 1A:
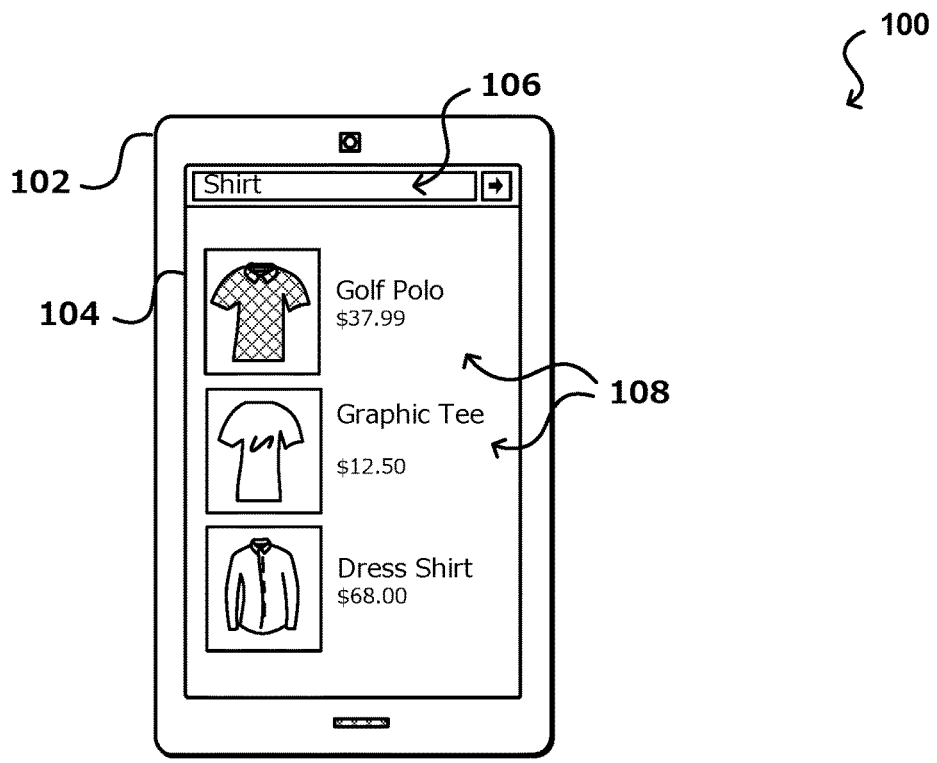
FIGS. 1A and 1B illustrates a computing device providing access to an electronic marketplace, in accordance with various embodiments.

Systems and methods in accordance with various embodiments of the present disclosure may overcome one or more of the aforementioned and other deficiencies experienced in conventional approaches for determining content to provide to a user in an electronic environment. In particular, various embodiments utilize a machine learning-based approach to identify sets of items, such as articles of clothing, that reflect a user's style preference based on a gender scale.

In various embodiments, an electronic catalog of apparel items can be assigned respective gender scores in accordance with a gender scale by a neural network trained to determine a gender score of an apparel item based on an image representation of the apparel item. For example, the gender scale can extend between masculine and feminine ends and can include a plurality of values therebetween. A gender score of an item reflects a position on this scale, and serves as a measure of how masculine or feminine the item is as determined by the trained neural network. For example, the masculine end of the gender scale may be represented by a value of 1 and the feminine end may be represented by a value of 10, and a shirt may be assigned a value of 7, indicating that it is not completely traditionally feminine (i.e., has some masculine quality), but overall leans more feminine than masculine.

The neural network may be trained using a corpus of training data that includes image representations of various apparel items and their gender designations. Specifically, in one example, the training data includes traditionally masculine items (i.e., items exemplifying the masculine end of the scale) and traditionally feminine items (i.e., items exemplifying the feminine end of the scale), and respective designations. In other words, the neural network is given examples of what is traditionally considered masculine and what is traditionally considered feminine. The neural network can learn which features of an image are highly correlated with such determinations and extract those features to form a feature vector for each training image. The feature vectors can then be mapped to a 2-dimensional space (e.g., scale), thereby defining the gender scale. Thus, when the trained neural network is applied to an image representation of a new apparel item to determine a gender score for the new apparel item, the neural network can determine a feature vector for the new item and determine how similar the feature vector is to the feature vectors of the training images designated as masculine items and the feature vectors of the training images designated as feminine items, and thus determine its position on the gender scale. For example, the masculine end of the gender scale may be represented by a value of 1 and the feminine end may be represented by a value of 10, and a shirt may be assigned a value of 7, indicating that it is not completely traditionally feminine (i.e., has some masculine quality), but overall leans more feminine than masculine. In some embodiments, the gender scale may be defined by continuous or discrete values, and the gender score can be continuous or discrete. In some embodiments, the gender score may be a discrete value that represents a range of values on the gender scale.

Through the above described techniques, the apparel items in the electronic catalog may have a gender score attribute and can thus be organized (e.g., sorted, filtered, ranked) based on a non-binary gender score in addition to other attributes, such as item type, size, color, brand, etc. Thus, a user can include non-binary gender style as a search or filtering criteria. In various embodiments, the user can select a gender input value as a search or filtering criteria. The gender input value may correlate to a certain gender score or range of gender scores. Thus, the search or filtering results may include items having such gender score(s). The gender input value can be collected from the use in various formats. For example, an electronic marketplace interface may include a slider having a masculine end and a feminine end, and the user can slide the slider to one of a plurality of positions, the selection position representing the gender input value. In another example, the user can be presented with a plurality of selectable images illustrating apparel items that exemplify different gender scores and asked to select the image that best represents what they're looking for. The selected image is taken as the gender input value.

In some embodiments, the gender input value may be associated with another search query. For example, the user may search for "white shirt" and apply a gender input value to the search. Thus, the search results responsive to "white shirt" may be further filtered according to the gender input value such that the returned results are white shirts that have the appropriate gender scores. In some embodiments, the gender scores of certain apparel items may be refined based on individual user data, such as a user's body measurements or body shape. For example, a certain t-shirt of a specific size may have a different gender score for a user with a smaller build than for a user with a larger build.

Various other features and application can be implemented based on, and thus practice, the above described technology and presently disclosed techniques. Accordingly, approaches in accordance with various embodiments improve the operation and performance of the computing device(s) on which they are implemented and with which they communicate wirelessly by, among other advantages, increasing the accuracy of providing recommended and/or related content using machine learning techniques. Such a system can improve an online shopping experience, for example, in that it provides results that are not readily accessible with present technology. From one perspective, the present technology presents an interface that enables faster and more accurate delivery of content. Moreover, the present techniques impart a specific and new functionality to content management and distribution systems. Approaches presented herein can work on catalog or other stored images, as well as mobile queries or social media images of apparel items, etc. Such approaches can also support multiple possible forms of outputs, which can simplify integration with other visual or non-visual attributes in a general-purpose apparel shopping engine or other such application. Various other applications, processes, and uses are presented below with respect to the various embodiments, each of which improves the operation and performance of the computing device(s) on which they are implemented.

Figure 1B:
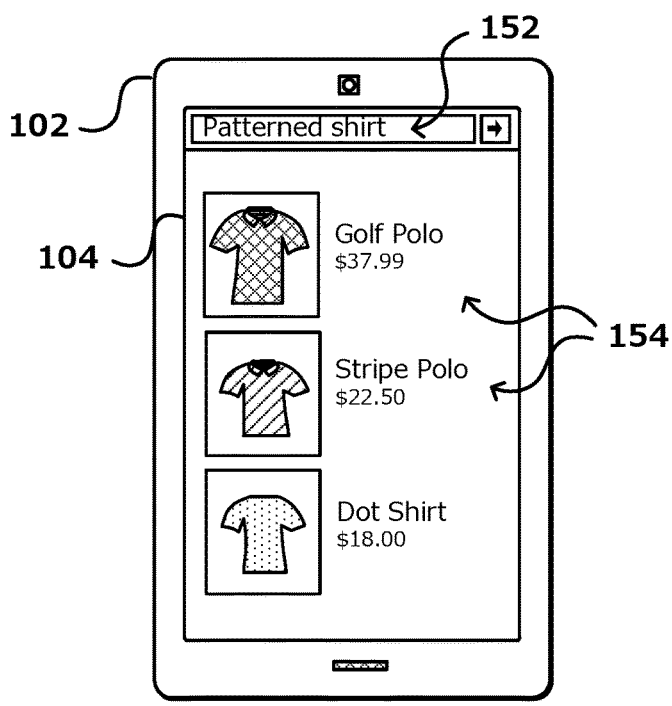

FIGS. 1A and 1B illustrate example situations 100 and 150 wherein a user is interacting with a computing device 102. In this example, although a tablet computing device is shown in this example, it should be understood that various other types of electronic device that are capable of determining and processing input can be used in accordance with various embodiments discussed herein. These devices can include, for example, smart phones, e-book readers, desktop computers, notebook computers, personal data assistants, video gaming consoles or controllers, smart televisions, and portable media players, wearable computers (e.g., glasses, watches, etc.) among others. Further, the components illustrated can be part of a single device, while at least some components illustrated and otherwise utilized for such a device can be provided as one or more peripheral devices or accessories within the scope of the various embodiments.

In a conventional system, a user can search for items (goods and/or services) in an electronic item catalog of an electronic marketplace. A catalog of items (including each item's description) may be organized into a "browse tree" structure in order to facilitate searching. A browse tree permits users to "browse" through various items, which are arranged in the form of a hierarchical tree. The browse tree may be displayed via a user interface as a collection of hyperlinks, each hyperlink corresponding to a section of the tree. A user can find an item by navigating through the various nodes of the browse tree.

Additionally, in many situations, the electronic marketplace may provide a search interface 106 that enables a user to search for a desired item. The search interface may return search results based on relevance of particular items to the customer's search query. For example, FIG. 1A illustrates an example display of content on a display screen 104 of a computing device 102. In this example a search query has been received and a set of search results 108 determined and returned for presentation in response to the request. In this example the user has submitted a query including the keyword "shirts" and the returned search results have been determined to be relevant in some way to the keyword. This can be due to a categorization of the results, keywords associated with the results, or tags applied to the result, among other such options. The user can scroll or otherwise navigate through the results to determine whether any of the results are of interest to the user.

It might be the case, however, that there were too many results returned and the user is not finding items of interest in an initial subset of the results. Accordingly, the user might want to narrow the query in order to obtain search results that are more relevant or of interest to the user based on the user's current interest. For example, FIG. 1B illustrates example 150 of an updated set of search results 154 returned for a new query 152 that specifies "Patterned shirts" Similarly, if the user would like a different type of shirt the user might want to modify the query in some way. However, even with a search interface in place, it can be difficult for customers to find relevant items. Generally, users often rely upon search queries or keyword strings that can be used to identify potentially relevant items. In many instances, however, the relevance depends at least in part to the actual query that was submitted, as well as the way in which the potentially relevant content is categorized or identified. There often is no easy way for a user to modify a query to express a desired refinement, and no accurate way for that expression to be implemented so as to locate the content of interest. Unless the user knows an exact brand or style of an item that the user wants, or the appropriate search terms, the user might have to search through hundreds or thousands of different items using various options to attempt to locate the type of item in which the user is interested. If the user is interested in an item of a specific type, the user might have no option but to sift through these results, potentially only being able to narrow the results by price, ratings, availability, or other such options. For example, apparel items in an electronic marketplace are typically categorized by binary gender, and users can only select between a predefined set of men's apparel items and a predefined set of women's apparel items. However, a user's personal style may not be defined in such a binary way. Moreover, some items may be arbitrarily defined as men's clothing or women's clothing. For example, a plain white t-shirt may be categorized as men's clothing when it could just as easily be categorized as women's clothing. However, because of its designation by the designer or merchant, it may only show up in the men's clothing category although a user browsing the women's category may actually be looking for such an item. The user may never discover the item and a potential sale is lost. Accordingly, various embodiments of the present disclosure, utilize machine learning-based approaches to organize and deliver content items, such as articles of clothing, based on a user's style preference on a scale, such as a gender scale.

Figure 2:
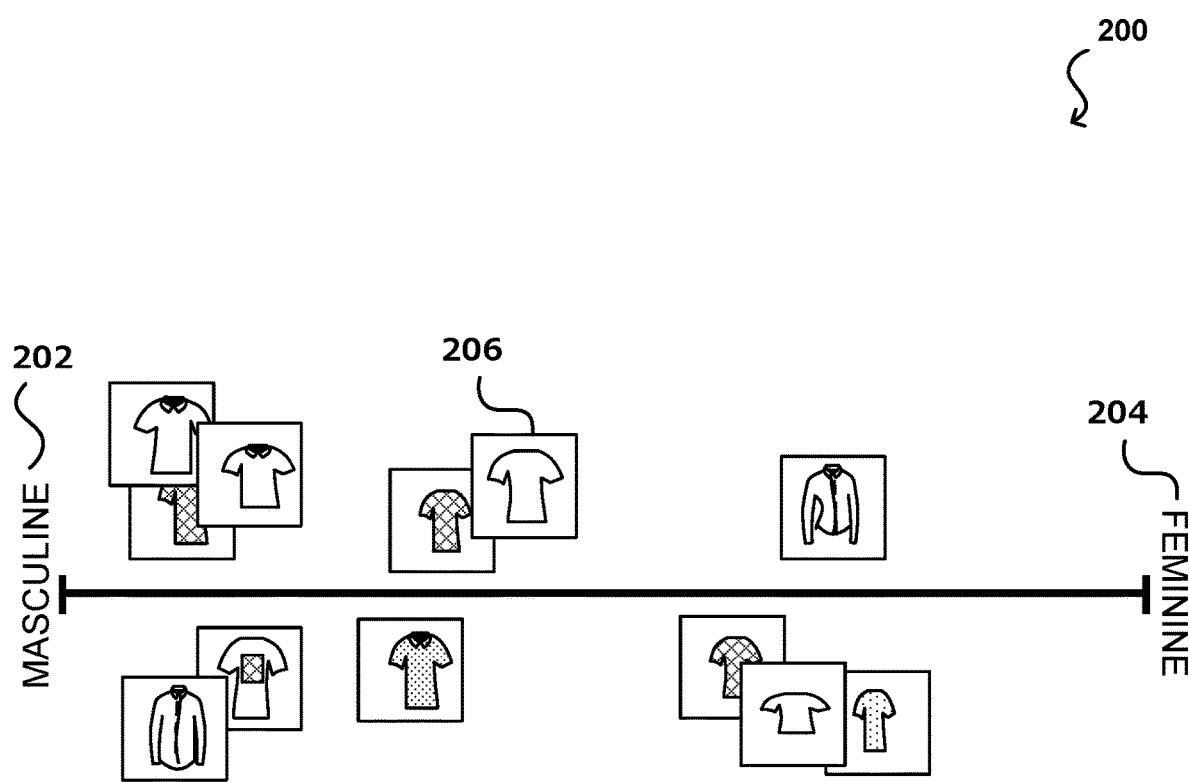
FIG. 2 illustrates a visual representation of a gender scale, in accordance with various embodiments.

FIG. 2 illustrates a visual representation 200 of a gender scale 200, in accordance with various embodiments. For example, the gender scale is defined by a masculine end 202 and a feminine end 204, and includes a plurality of values therebetween. An apparel item 206 may be assigned gender score, which represents where the apparel item 206 falls on the gender scale 200. In some embodiments, the gender scale may be defined by continuous or discrete values, and the gender score can be continuous or discrete. In some embodiments, the gender score may be a discrete value that represents a range of values on the gender scale. The feature vectors can then be mapped to a 2-dimensional space (e.g., scale), thereby defining the gender scale. Thus, when the trained neural network is applied to an image representation of a new apparel item to determine a gender score for the new apparel item, the neural network can determine a feature vector for the new item and determine how similar the feature vector is to the feature vectors of the training images designated as masculine items and the feature vectors of the training images designated as feminine items, and thus determine its position on the gender scale 200. In various embodiments, an electronic catalog of apparel items 206 can be assigned respective gender scores on a gender scale 200 by a neural network trained to determine a gender score of an apparel item based on an image representation of the apparel item. A gender score of an item reflects a position on this scale, and serves as a measure of how masculine or feminine the item is as determined by the trained neural network.

Figure 3:
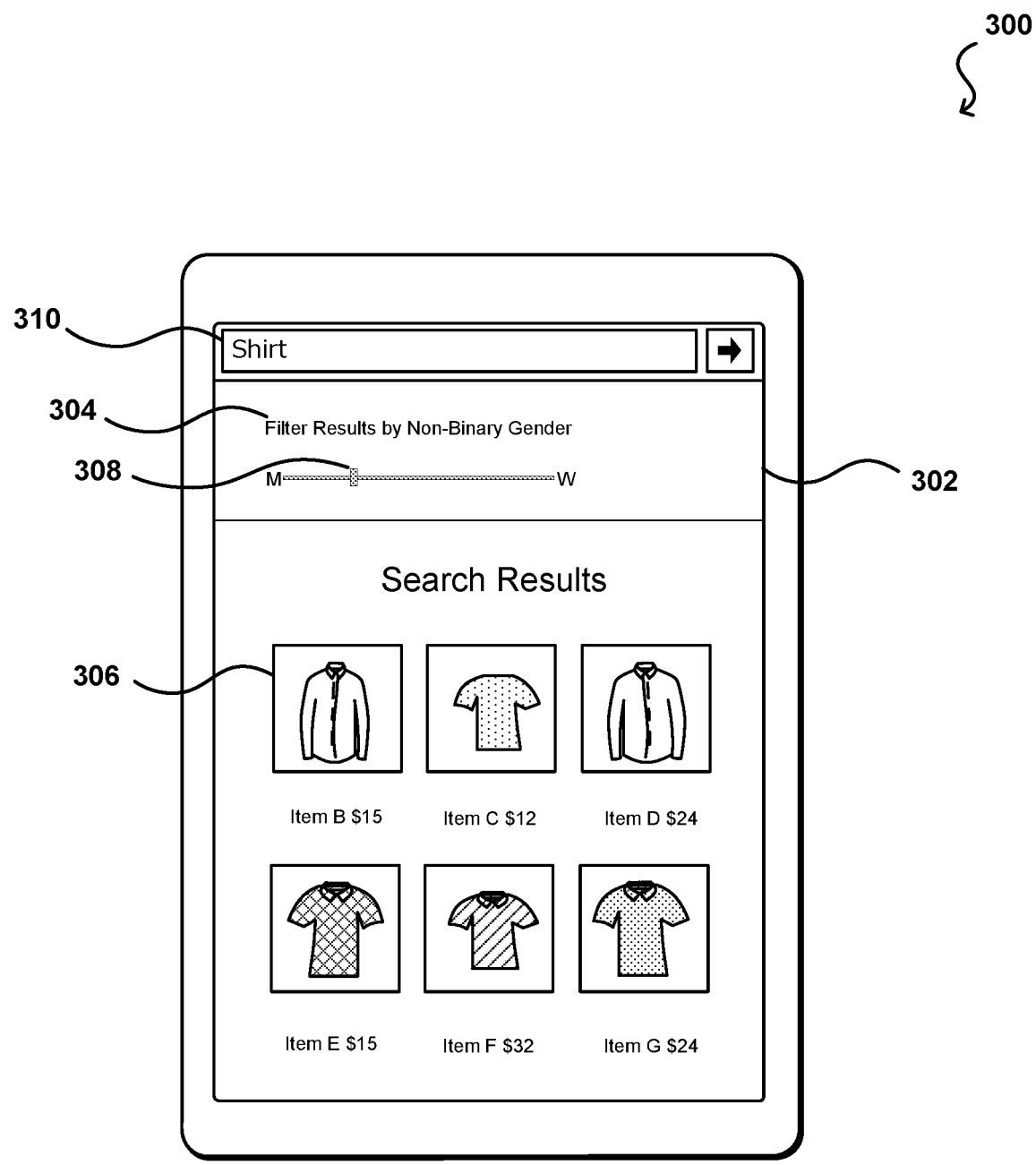
FIG. 3 illustrates an example interface providing item filtering by non-binary gender, in accordance with various embodiments.

FIG. 3 illustrates a device 300 displaying an example user interface 302 of an electronic marketplace providing a non-binary gender selector 304 as a filtering means. The apparel items in the electronic catalog may have a gender score attribute and can thus be organized (e.g., sorted, filtered, ranked) based on a non-binary gender score in addition to other attributes, such as item type, size, color, brand, etc. Thus, a user can include non-binary gender style as a search or filtering criteria. In various embodiments, the user can select a gender input value as a search or filtering criteria. The gender input value may correlate to a certain gender score or range of gender scores. Thus, the search or filtering results 306 may include items having such gender score(s). The gender input value can be collected from the use in various formats. For example, and as illustrated in FIG. 3, an electronic marketplace interface may include a slider 308 having a masculine end and a feminine end, in which the user can slide the slider 308 to one of a plurality of positions, the selection position representing the gender input value. In another example, the user can be presented with a plurality of selectable images illustrating apparel items that exemplify different gender scores and asked to select the image that best represents what they're looking for. The selected image is taken as the gender input value. In some embodiments, the gender input value may be associated with another search query 310. For example, the user may search for "shirt" and apply a gender input value to the search. Thus, the search results 306 may include items responsive to the query "shirt" and that which meet the gender input value selected at the selector 304.

Figure 4:
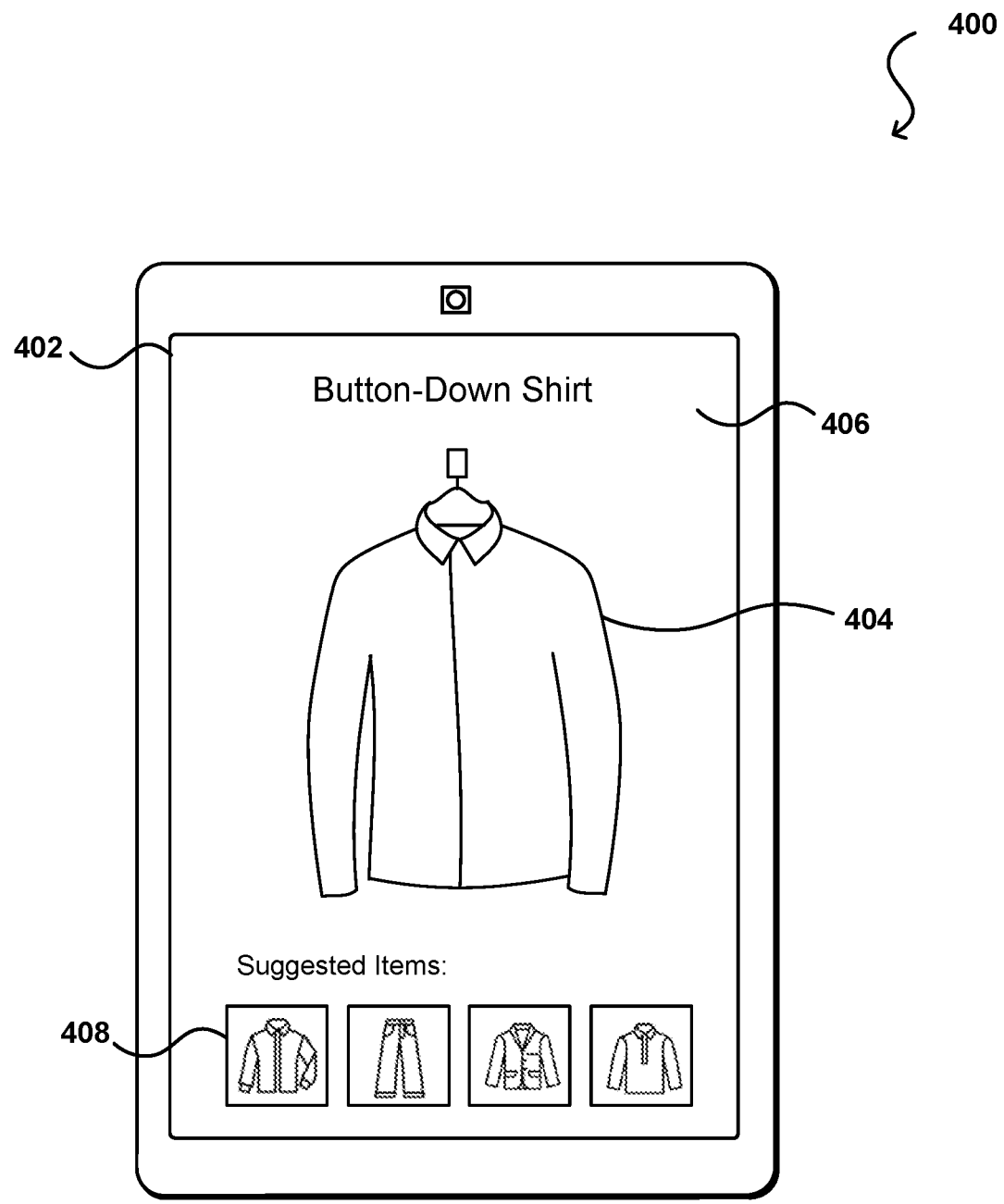
FIG. 4 illustrates an example interface providing recommendations based on gender score, in accordance with various embodiments.

FIG. 4 illustrates a device 400 displaying an example user interface 402 of an electronic marketplace providing item recommendations based on gender score. In various embodiments, an item 404 may have been selected from a previous page displaying a plurality of items. Thus, the selected item 404 is prominently display, for example, in an item details page 406 or modal window. The selected item 404 may be associated with a certain gender score. The page may include a plurality of suggested items 408 that have similar gender scores. In some embodiments, the suggested items may include items of the same category as the selected item 404 that have a similar gender score. In some embodiments, the suggested items may include items that are responsive to a previous search query that have a similar gender score. In some embodiments, the suggested items may include items from other categories that have a similar gender score.

Figure 5:
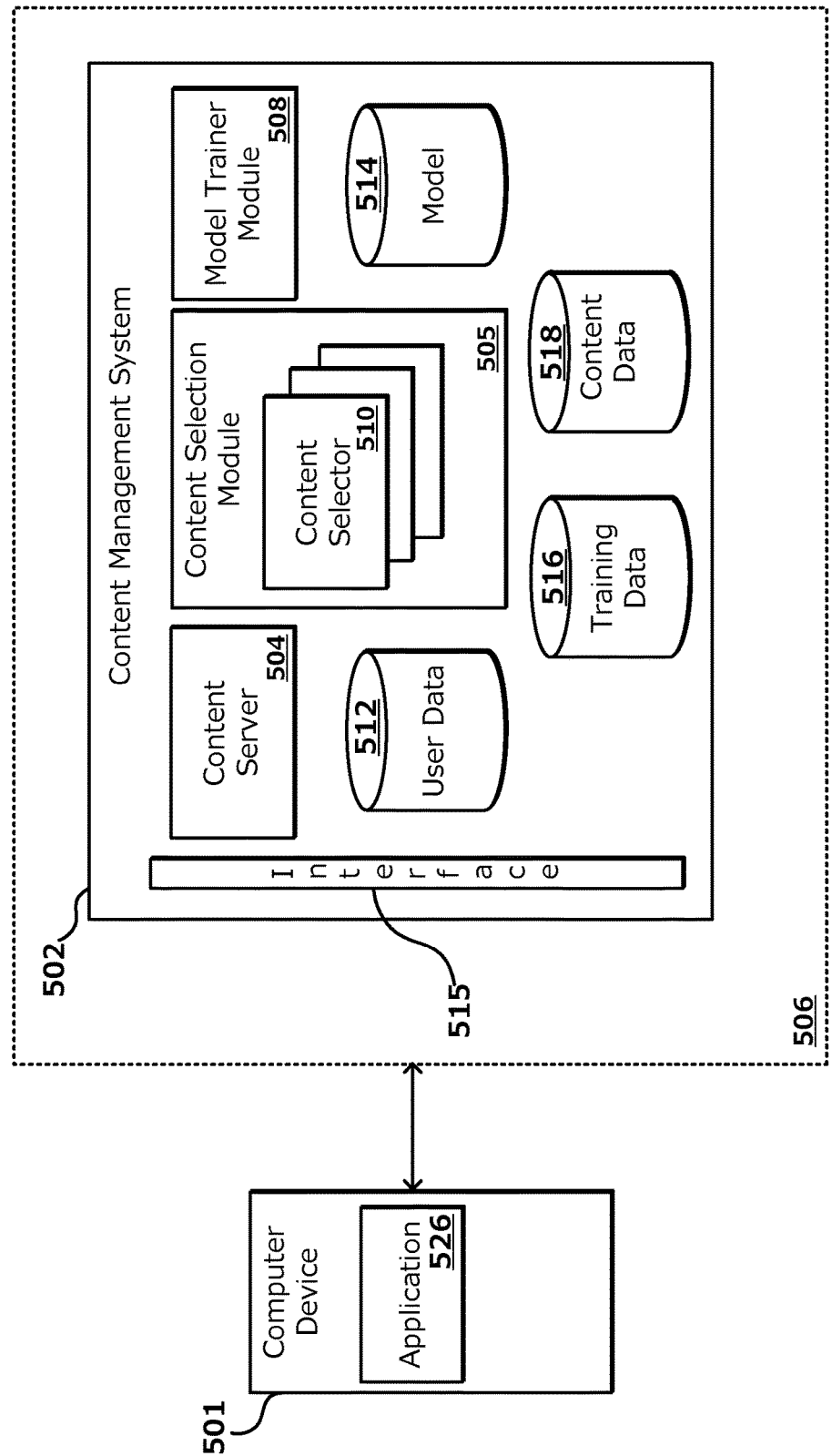
FIG. 5 illustrate an example an example environment providing searching for and/or narrowing search results by non-binary gender, in accordance with various embodiments.

FIG. 5 illustrates an example system 500 in accordance with an embodiment. As shown in FIG. 5, a content management system 502 associated with an entity 505 such a service provider can include content server 504, a content selection module 506, and a model trainer module 508. In some embodiments, content selection module 506 may include multiple content selectors 510 configured to select content for particular trained modules based on gender scores. It should be noted that the trained models include trained neural networks and/or classifiers of such neural networks. Additional or alternative components and elements can be used in such a system in accordance with the various embodiments. Accordingly, it should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein.

The content management system 502 may also include various data stores to store data and/or files in connection with customized content generation. For example, the content management system may include a user data store 512 to store data about individual users, including information regarding interests, demographic characteristics, user preferences, body measurement information, three-dimensional body information, content interaction (e.g., clicks, likes, shares) and purchasing history etc. The model data store 514 may include one or more models (e.g., trained neural networks and/or classifiers) generated by model trainer module 508. In some embodiments, a model may be generated for each content type that may be served by content management system 502. For example, a first model may correspond to pants, a second model may correspond to shirts, a third model may correspond to shoes, and so forth.

The content management system may also include a training data store 516 to store data for use in training a neural network, classifiers, etc. including information regarding different types of apparel items, such as tops, bottoms, dresses, shoes, hats, or accessories. Tops, for example, can include shirts, blouses, t-shirts, or sweaters, and bottoms can include pants, shorts, jeans, or skirts, for instance. The content management system may also include a content data store 518 to store the corpus of content (or information about the content) available to be distributed to user devices. The data stores and other components of the content management system and described herein are illustrative only, and are not intended to be limiting. In some embodiments, fewer, additional, and/or alternative data stores and/or components may be implemented by a content management system.

The content management system 502 may be implemented on one or more physical server computing devices that provide computing services and resources to users. In some embodiments, the content management system (or individual components thereof, such as the content server 504, model trainer module 508, etc.) may be implemented on one or more host devices, such as blade servers, midrange computing devices, mainframe computers, desktop computers, or any other computing device configured to provide computing services and resources. For example, a single host device may execute one or more content servers, one or more group generators, various data stores, some combination thereof, etc. The content management system may include any number of such hosts.

In some embodiments, the features and services provided by the content management system 502 may be implemented as web services consumable via a communication network. In further embodiments, the content management system (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

Individual user devices 102 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A user may operate a user device to access and interact with content managed by the content management system 502. In some embodiments, a user may launch specialized application software, such as a mobile application 526 executing on a particular user device 501, such as a smart phone or tablet computer. The application 526 may be specifically designed to interface with the content management system for accessing and interacting with content. In some embodiments, a user may use other application software, such as a browser application, to interact with the content management system.

In this example, the computing device 102 can search for content from the service provider via a communication network. For example, computing device 102 can request content such as text, documents, audio recordings, video, images, animations, and the like. The content request can be received at content server 504. The request can be received at, for example, a network interface layer 515. The network interface layer can include any appropriate components known or used to receive requests from across a network, such as may include one or more application programming interfaces (APIs) or other such interfaces for receiving such requests. The network interface layer 515 might be owned and operated by the service provider, or leveraged by the service provider as part of a shared resource or "cloud" offering. The network interface layer can receive and analyze the requests from the computing device, and cause at least a portion of the information in the requests to be directed to an appropriate system or service of the content management system.

For example, when a user accesses application 526 on a computing device 102 to request content, the computing device may establish a connection with the content management system 502. The computing device may receive content from a content server 504 of the content management system via the connection. The content may include network resources such as Web pages, content posts, documents, images, videos, and the like. Illustratively, the content may be received as an individual piece of content (an individual Web page), as a set of results, or in some other format. A user of the computing device can interact with the content by activating links to other content, submitting search queries, initiating the purchase of items referenced in the content, etc. Information regarding user interactions with the content can be transmitted to the content management system for processing by content server 504. In addition, information regarding the interactions, or some subset thereof, may be stored for use in training and/or adjusting any appropriate machine learning approaches. For example, information regarding interactions may be stored in the training data store 516.

With a set of search results, such as response to a search for a certain type of clothing, a user can be presented one or more filter or other refinement options. The refinement options can include filters for, color, size, price, rating, gender, among other such options. In various embodiments, the refinement options include a non-binary gender filter, which filters the search results, or an entire catalog of items, based on a non-binary gender style. The filtering option used to filter search results based on non-binary gender style can be represented as a range between most masculine and most feminine. The items in the database may have a gender score attribute and can thus be organized (e.g., sorted, filtered, ranked) based on a non-binary gender score in addition to other attributes, such as item type, size, color, brand, etc. Thus, a user can include non-binary gender style as a search or filtering criteria. In various embodiments, the user can select a gender input value as a search or filtering criteria. The gender input value may correlate to a certain gender score or range of gender scores. Thus, the search or filtering results may include items having such gender score(s). As described, a gender score serves as a measure of how masculine or feminine an item is as determined by the trained neural network based on the training data. Factors may include, for example, the fit of an apparel item, colors, patterns, material, size, cut, graphics, proportions, etc., but the specific features of an apparel item that are highly correlated with determination of gender are determined by the trained neural network based on training data.

As described, various embodiments of the present disclosure include approaches for determine a gender score for apparel items. One such approach includes using a machine-learning based model, such as a neural network. In a first step of such an approach, training data is obtained or generated. In an example embodiment, the neural network may be trained using a corpus of training data that includes image representations of various apparel items and their gender designations. Specifically, the training data may include traditionally masculine items (i.e., items exemplifying the masculine end of the scale) and traditionally feminine items (i.e., items exemplifying the feminine end of the scale), and respective designations. In other words, the neural network is given examples of what is traditionally considered masculine and what is traditionally considered feminine. The training images may represent a subset of apparel items selected from a database or electronic catalog of apparel items. Alternatively, the training images may represent a subset of apparel item outside of the database or electronic catalog or apparel items. The training images may be pre-annotated with gender designations or annotated by a human annotator. In some embodiments, the training images may be selected and annotated with gender designations based on a set of guidelines or the annotators heuristics associates with traditional masculine archetypes and traditionally feminine archetypes. In some embodiments, training images may be selected that exemplify various other points on the scale rather than just the masculine and feminine extremes of the scale. Such training images are annotated with a non-binary gender designation reflecting the portion of the scale it exemplifies. For example, gender neutral apparel items may be selected as training images and annotated with a gender-neutral designation, which, in some embodiments, may reflect be half way between the masculine and feminine ends of the scale. Training images may take on various forms. For example, training images may include image representations of apparel items laid out, hung on a hanger, worn by a mannequin, worn by a model, and so forth. In some embodiments, the images may undergo various pre-processing, such as to remove image background, remove the model, or any other information that may be contained in the image that is not a feature of the apparel item.

After training data is obtained, the model can be trained using the training data. Various machine learning-based models can be trained for various the types of apparel, such as t-shirts, blouses, jackets, sweaters, shorts, pants, jeans, shoes, hats, and so forth. Names of categories and their respective qualifying criteria may be pre-loaded with the present technology or, alternatively, new categories with customized criteria may be implemented by a user of the present technology. A model can learn which features of an image are highly correlated with such determinations and extract those features to form a feature vector for each training image. The feature vectors can then be mapped to a 2-dimensional space (e.g., scale), thereby defining the gender scale. Thus, when the trained neural network is applied to an image representation of a new apparel item to determine a gender score for the new apparel item, the neural network can determine a feature vector for the new item and determine how similar the feature vector is to the feature vectors of the training images designated as masculine items and the feature vectors of the training images designated as feminine items, and thus determine its position on the gender scale. For example, the masculine end of the gender scale may be represented by a value of 1 and the feminine end may be represented by a value of 10, and a shirt may be assigned a value of 7, indicating that it is not completely traditionally feminine (i.e., has some masculine quality), but overall leans more feminine than masculine. In some embodiments, the gender scale may be defined by continuous or discrete values, and the gender score can be continuous or discrete. In some embodiments, the gender score may be a discrete value that represents a range of values on the gender scale.

In accordance with various embodiments, examples of machine learning include neural networks. Neural networks can be used to learn the relationships between items across various visual attributes through the analysis of various types of training data, such as those attributing to designation of gender score. For example, deep neural networks can be trained using a set of training images exhibiting different types or values for a given attribute that can then be applied to content of one or more categories or types of items. In other embodiments, generative adversarial networks (GANs) can be used that do not require the seeding used for training deep neural networks. Various other approaches can be used as well as discussed and suggested elsewhere herein. Deep neural networks, or deep learning, can involve representing images or other content items as vectors or sets of edges or regions to simplify the learning task. These processes can allow for unsupervised learning and hierarchical feature extraction, among other such options. Deep learning algorithms can transform these inputs through multiple layers of transformation to describe causal connections between input and output. GANs can estimate a general model of such inputs using an adversarial process, as may utilize a generative model and a discriminative model. The discriminative model discriminates between different classes of data, such as a convolutional neural network trained to provide different outputs for different recognized classes. The generative model generates new data that fits the distribution of the training data. The generative model can be, for example, a Gaussian mixture model that can generate a set of points which approximately fit the training data. Various other networks or trained models can be used as well within the scope of the various embodiments. For approaches that require seeding, there can be a set of training data defined or otherwise generated for each attribute applied for a given category. The attributes can be defined by an administrator or other authorized entity, or can be learned algorithmically based on user queries, among other such options.

As described above, an image representing an apparel item can be used as training data for a neural network. The image can be classified, either when provided or through a classification analysis, to determine a primary classification, such as apparel type (e.g., shirt, jacket, pants). The classification can be used to provide training data to the appropriate model or classifier for that apparel type. In at least some embodiments a localization process can be used to attempt to select a portion of the training image that includes the type of apparel item of interest. For a sleeve length of a shirt this can include locating the arms of a person represented in the image and for belt style may include identifying a waist region of the person, among other such options. In an example, a neckline detector can be used to determine the region of the image that likely corresponds to the neckline portion, as discussed in more detail elsewhere herein. A number of state of the art detectors, including those discussed elsewhere herein, can be used to determine a region of an image corresponding to an attribute, or fashion detail in this example. Once that region has been identified, the image data from the region can be cropped, copied, trimmed, or otherwise obtained as a discrete patch, file, or data set for processing. In some embodiments the image data can be sent to a classifier that is able to analyze the data and determine a type of neckline, or categorization of neckline that most closely matches what is represented in the image data. In some embodiments, the image data is processed before being sent to the classifier. This can include, for example, performing feature extraction on the cropped image data. In an example, a cropped image data is fed into a deep neural network, and from the fully connected layers output is received that can be used as a feature vector. The feature vector can then be fed to a classifier for classification.

In some embodiments the neural network can be trained using images from a catalog that include metadata, description, classification, or other data that can be used to identify an image having apparel items for the desired area of the body. Localization can then be performed to determine the relevant region, and that data fed to the neural network for training. While the process may not be completely accurate, a large enough data set should enable the network to be trained on the relevant region without being negatively impacted by the occasional improper categorization or localization. In some embodiments, a conventional training process can be used with the deep neural network, although various other approaches can be used that may provide particular advantages as well. In some embodiments the fully connected layers of the network can also be analyzed without need to analyze the classification result of the final layer. Intermediate features from the network can be used for similarity calculations in at least some embodiments.

In accordance with various embodiments, gender scores can be weighted and/or tailored for different users. Specifically, the gender scores of certain apparel items may be refined based on individual user data, such as a user's body measurements or body shape. For example, a certain t-shirt of a specific size may have a different gender score for a user with a smaller build than for a user with a larger build. In some embodiments, this can include weighting gender scores based on the expected "fit" (e.g., tightness or looseness and coverage) of an item for the specific user based on some data such as the user's typical clothing size or body measurements. For example, a pair of jeans may be analyzed to determine if the pair of jeans may be classified as, for example, skinny, tight, regular, loose, or baggy. This classification may be used to alter the gender score associated with the apparel item. For example, if a pair of jeans is listed as regular fit on a third party web site, the present technology may utilize an image of the jeans from the third party web site to make an independent determination of the tightness or looseness of the pair of jeans for a particular user. A multitude of other apparel items may be utilized with the present technology such as, for example, an image of a pair of pants, which may be analyzed to determine tightness of the dress based on the present technology that determines the length of the hemline or the length of the sleeves of the dress. Such data may influence the gender score of an apparel item as it pertains to a specific user or all users. The fit of an apparel item can be determined based on profile information of a user. The profile information can include a model (e.g., a three-dimensional virtual model) of the user and other user information that can be used to represent the general size (e.g., body dimensions, height, etc.) of the user as well as other characteristics of the user (e.g., shoe size, complexion, etc.) The profile information can include additional information related to, for example, preferences of the user (e.g., clothing fit preferences, modesty preferences), as well as other information that may indicate interests of the user as they relate to clothing and/or accessories.

Actions taken by a user can also be used to train or refine the models as well. For example, if a user submits a refinement and obtains a result that leads to a click, like, share, or purchase of the corresponding item, then that refinement can be used as a correct refinement vector for that attribute that can be used as an additional input to train the corresponding model. As attribute perception can change over time, data can also be weighted or decayed such that more recent data counts more heavily towards the refinement, and data past a certain age may be discarded from consideration. As described, a gender score is based in part on a perceived style of an apparel item. In various embodiments, brand reputation may affect the gender score. For example, a brand known to design clothes that are generally very feminine may receive a more feminine leaning gender score. User reviews or comments about an apparel item, description information for an apparel item, etc. may also affect the gender score for that apparel item. It should be noted that these and various other factors may be carry different weight in determining a gender scores of an apparel item. In some embodiments, instead of using a machine-learning based model to assign gender scores to apparel items, the apparel items can be annotated by a feature based image processing algorithm, other predefined algorithm, or by a human annotation. For example, a human annotator may follow a set of guidelines or heuristics in determining a gender score for an apparel item.

Figure 6:
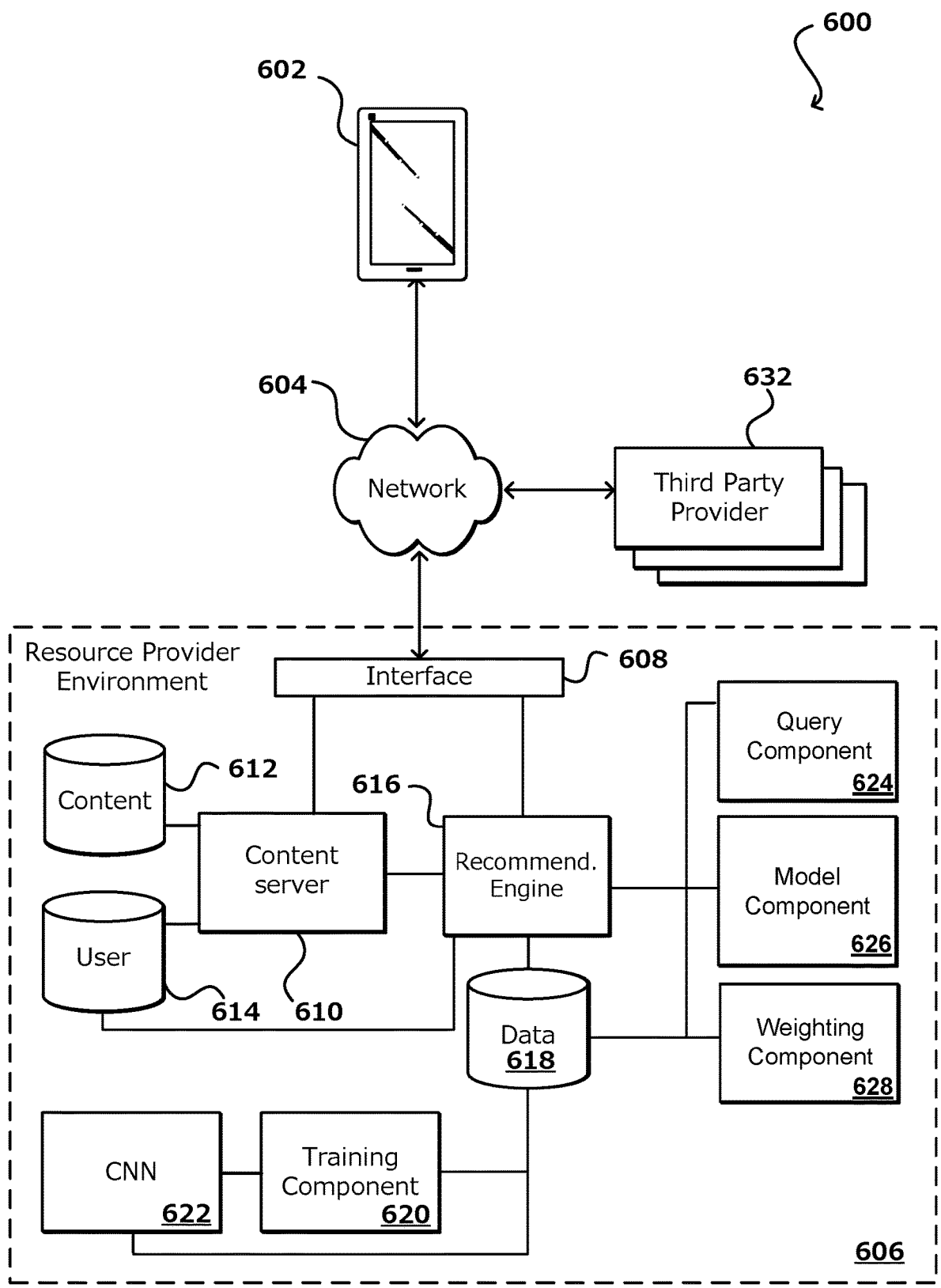
FIG. 6 illustrates an example environment in which aspects of the various embodiments can be implemented in accordance with various embodiments.

FIG. 6 illustrates an example environment 600 in which aspects of the various embodiments can be implemented. In this example, a computing device 602 is able to make a call or request across one or more networks 604 to a resource provider environment 606. The network(s) can include any appropriate network, such as the Internet, a local area network (LAN), a cellular network, an Ethernet, or other such wired and/or wireless network. The resource provider environment 606 can include any appropriate resources for providing content from a resource provider, as may include various servers, data stores, and other such components known or used for providing content from across a network (or from the "cloud").

In this example, a request received to the resource provider environment 606 can be received by an interface layer 608 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content managers 610 and/or content servers, which can obtain the content from a content data store 614 or other such repository to be sent back across the network (s) to the computing device. In some embodiments, information for the request might also be compared against user data in a user data store 612 or other such location do determine, for example, whether the user has access rights to that content. In some embodiments user data might also be analyzed to determine which type of content to provide additional supplemental content to provide with the primary content, and the like.

In some instances a user might want to refine the results based upon a measure of non-binary gender style, which can be represented by a range of gender scores, and apparel items can be associated with a gender score. In at least some embodiments each category or type of item may have corresponding types of visual attributes that can be used to determine a gender score which can be used to refine the results. In some various embodiments control of these scores can be presented with the results, as may be determined by the content server 610 or the recommendation engine based upon data stored in the data repository 618 or determined using a query component 624 or model component 624, among other such options. When a subsequent request is received that requests a refinement using gender scores, the recommendation engine can work with the query component 624 and model component 626 to determine, among other things, the values for the refinement based on the query or prior results and the vectors for the individual attributes. As mentioned, in some embodiments the request might specify rankings or magnitudes for the options (e.g., upper half, bottom half, whole), which can be set in some embodiments using a weighting component 628 or other such mechanism.

The information can be fed back to the recommendation engine 616 which in this example includes the refinement logic to perform the lookup against the data in the data store 618 in order to determine the refined results.

The individual gender scores can be determined at least in part using neural networks 622 such as a CNN to determine the appropriate gender scores through training on an appropriate data set. The training component 620 can perform the training on the models and provide the resulting results and/or trained models for use in determining the individual gender scores. In order to determine gender scores for various content items, in at least some embodiments, some analysis of content items in an electronic catalog or other data repository is performed to determine information about the visual characteristics of the items. In some embodiments, one or more feature descriptors or vectors can be generated to describe various attributes of an image (such as brightness, formalness, etc.). The training component 620 can be the same system or service that is used to train a localizer, as well as various feature detectors or other models, networks, or algorithms discussed or suggested herein.

In the example shown in FIG. 6, a neural network 622 such as a convolutional neural network (CNN) can be trained using, for example, images of objects. As mentioned, for CNN-based approaches there can be pairs of images submitted that are classified by a type of attribute, while for GAN-based approaches a series of images may be submitted for training that may include metadata or other information useful in classifying one or more aspects of each image. For example, a CNN may be trained to perform object recognition using images of different types of objects, and then learn how the attributes relate to those objects using the provided training data. In certain embodiments, training a neural network may involve significant use of computation resources and time, such that this may correspond to a preparatory step to servicing search requests and/or performed relatively infrequently with respect to search request servicing and/or according to a schedule. An example process for training a neural network for generating descriptors describing visual features represented as a gender score of an image in a collection of images begins with building a set of training images. In accordance with various embodiments, each image (or pair of images) in the set of training images can be associated with an object label describing an object depicted in the image or a subject represented in the image. According to some embodiments, training images and respective training object labels can be located in a data store 618 that includes images of a number of different objects.

A training component 620 can utilize the training data set to train the neural network 622. As further described, neural networks can include several learning layers in their architecture. A query image from the training data set is analyzed using the neural network to extract a feature vector from the network before the classification layer. This feature vector describes the subject and/or objects shown in the image. This process can be implemented for each of the images in the data set, and the resulting object feature vectors can be stored in a data store. In various embodiments, the resulting object feature vectors can be compressed for improved processing. For example, the object feature vectors generated by the neural network may include object feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

The initial query image in some embodiments may be received from client device 602 over network 604 and processed by query component 624. In some embodiments, the query image can be received when a selection of an image from a third party provider 632 or resource provider environment 606 is selected, such as through the selection of a content item. When a query image is received, for example, a set of query object descriptors may be obtained or determined for the query image. For example, if the query image is not part of an electronic catalog and does not already have associated feature descriptors, the system may generate feature descriptors (both local feature descriptors and object feature descriptors) for the query content in a same and/or similar manner that the feature descriptors are generated for the collection of images, as described. Also, for example, if the query image is part of the collection then the feature descriptors for the query image may be obtained from the appropriate data store. Additionally, the query image can be analyzed to determine local feature descriptors for the query image. Using the clustered feature vectors and corresponding visual words determined for the training images, a histogram for the query image can be determined. The query image can also be analyzed using the neural network 622 to extract a feature vector from the network before the classification layer. This feature vector describes the subject and/or objects shown in the image. Using the local feature descriptors and object feature descriptors, visually similar images and images associated with a similar gender score in resource provider environment 606 can be identified. Also as described, in accordance with various embodiments, displayed with search results can be filtering or other refinement options that enable a user to filter the search results. The filtering options can include filters for, color, size, price, rating, gender score, among other such options.

Figure 7:
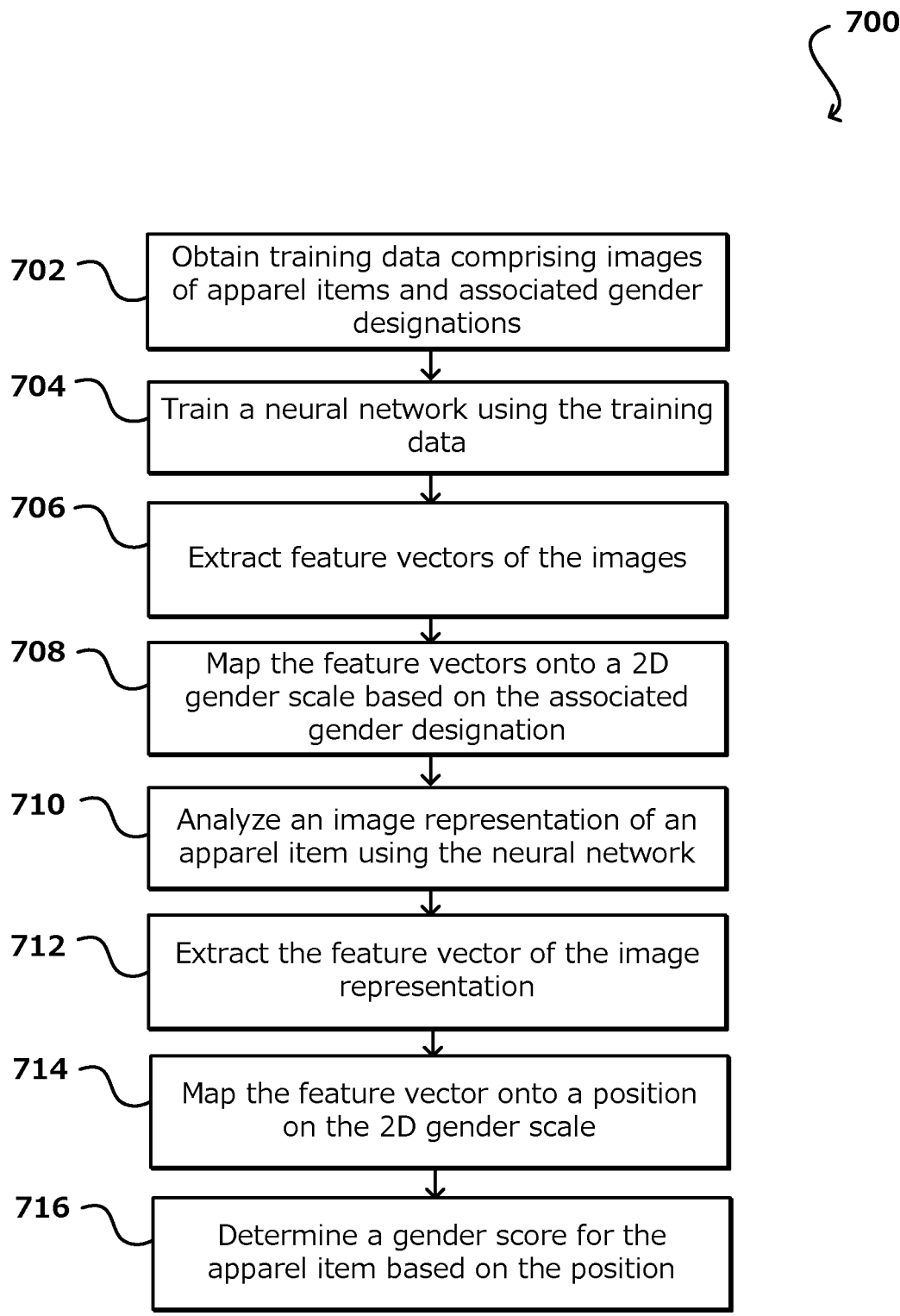
FIG. 7 illustrates an example process that can be utilized in such an environment in accordance with various embodiments.

FIG. 7 illustrates an example process 700 that can be utilized in such an environment in accordance with various embodiments. Specifically, FIG. 7 illustrates an example process 700 for determining a gender score of an item, which can be utilized in accordance with various embodiments. It should be understood that, for this and other processes discussed herein, there can be additional, fewer, or alternative steps, performed in similar or alternative steps, or in parallel, within the scope of the various embodiments unless otherwise stated. In this example, training data is obtained 702. The training data may include training images of apparel items and the associated gender designations of the apparel items. A neural network is trained 704 using the training data. Features vectors associated with the training images can be extracted 706 from the neural network. In some embodiments, the feature vectors are extracted from a layer of the neural network one or more layers before the classification or output layer. The feature vectors can be mapped 708 to a 2-dimensional gender scale based on the gender designations associated with the feature vectors by way of the apparel items they represent. Thus, the neural network is trained to map images of apparel items to the gender scale. In various embodiments, a plurality of clusters may identify based on the feature vectors and a plurality of classification bins may be determined based at least in part on the plurality of clusters. The gender scale may be defined by the plurality of classification bins and an assigned gender score corresponding to one of the plurality of bins. In various embodiments, clustering of images can be used to train a second model, such as a neural network with a classification layer. Specifically, the images that fall within a certain cluster or defined classification bin can be used as training images associated (e.g., annotated) with the respective cluster or bin for training the second model. Thus, in some embodiments, the second model may be trained to classify new images into one of a plurality of discrete non-binary gender classifications rather than on a continuous scale.

Thus, an image representation of an apparel item can be analyzed 710 using the trained neural network to determine a gender score for the apparel item. A feature vector associated with the image representation can be extracted 712 from the network and mapped 714 to the gender scale. A gender score can be determined 716 based on the feature vectors position on the gender scale. A feature vectors position on the gender scale may refer to how similar the feature vector is to the feature vectors of the training images representing traditionally masculine apparel items and how similar the feature vector is to the feature vectors of the training images representing traditionally feminine apparel items as determined by the neural network. Thus, the gender score may be a representation of such a measure or determination and can be expressed in various ways, such as a percentage, a normalized numerical value, a level, etc.

Figure 8:
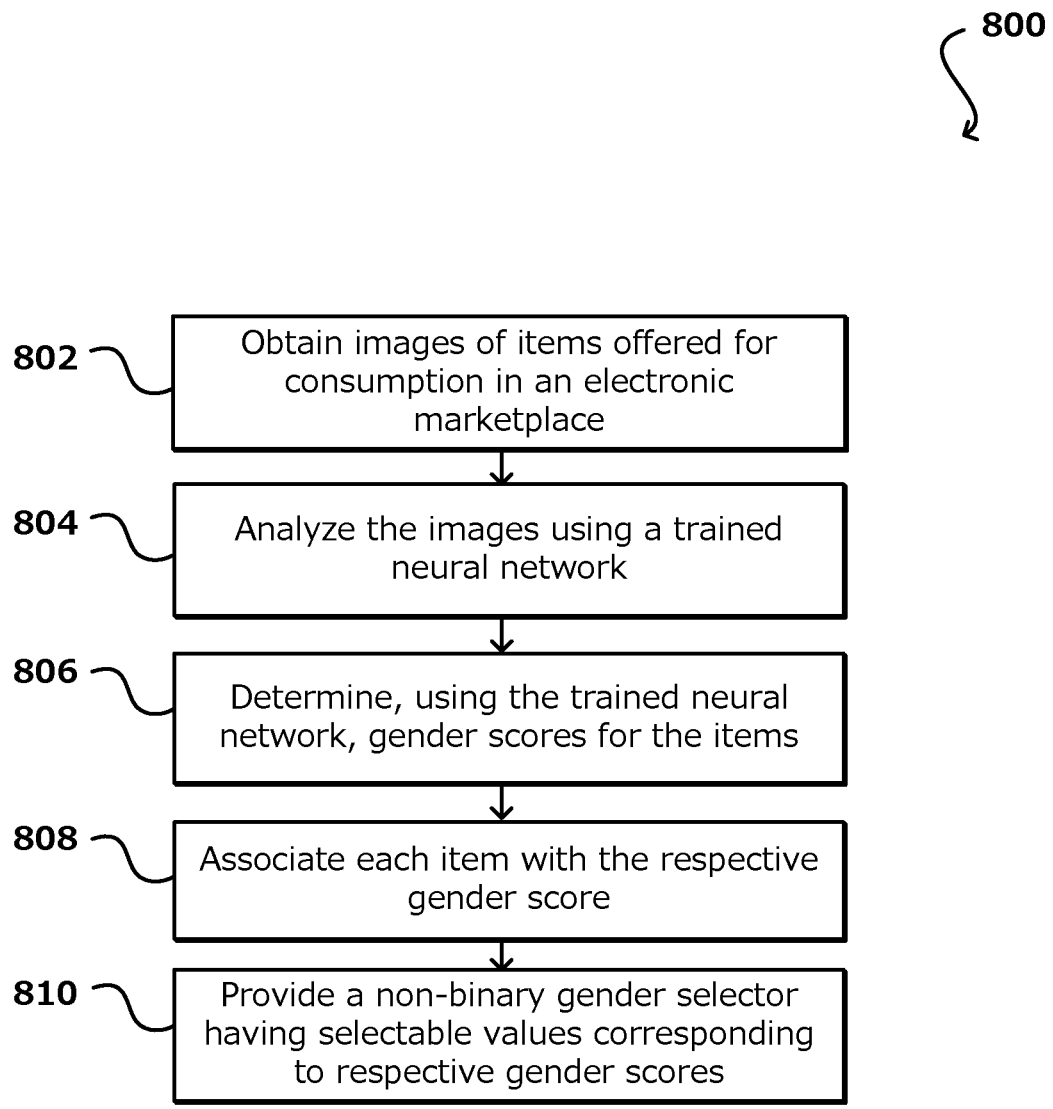
FIG. 8 illustrates an example process that can be utilized in such an environment in accordance with various embodiments.

FIG. 8 an example process 800 for creating an electronic marketplace having non-binary gender filtering that can be utilized in accordance with various embodiments. In this example, images of items offered for consumption through an electronic marketplace are obtained 802. The images may be existing product images in a database or electronic catalog. The images can be analyzed 804 by a trained neural network. In various embodiments, the neural network can be trained using training data. The training data may include training images of apparel items and the associated gender designations of the apparel items. The training images may include one or more of the images of items offered for consumption through the electronic marketplace that have been annotated with gender designations. Alternatively, the training images may be images of apparel items outside of the electronic marketplace. The neural network may be trained prior to analysis of the images of the items offered for consumption in the electronic marketplace, and may be trained by the electronic marketplace or a resource provider such services. Gender scores for the apparel items can be determined 806 using the trained neural network. The apparel items are then associated 808 with their respective gender scores. Furthermore, in order to provide non-binary gender filtering of items, a non-binary gender selector is provided 810, such as through a user interface of the electronic marketplace.

Figure 9:
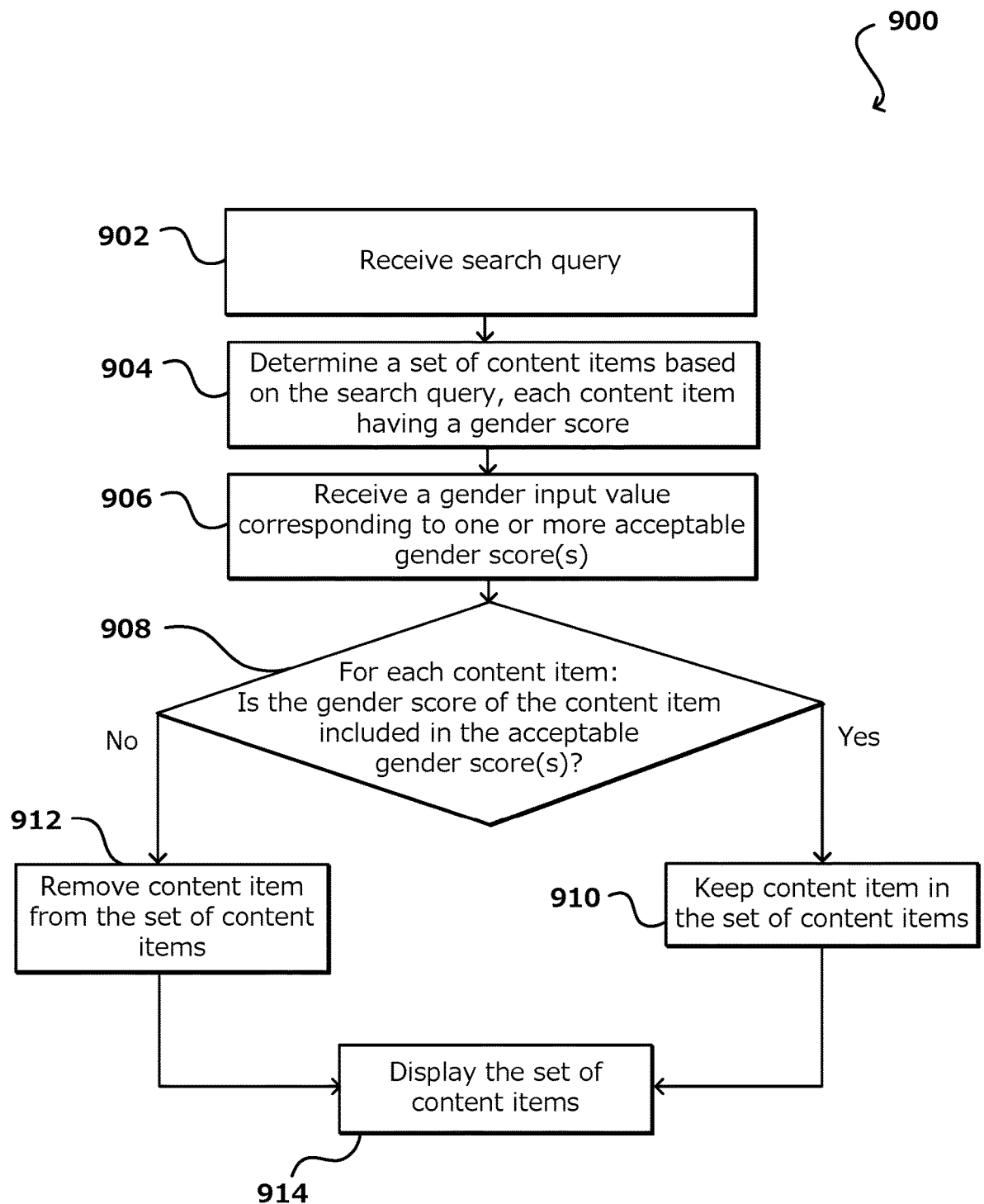
FIG. 9 illustrates an example process that can be utilized in such an environment in accordance with various embodiments.

FIG. 9 illustrates an example process 900 for refining search results based on non-binary gender preference that can be utilized in accordance with various embodiments. In this example, a search query (i.e., request) is received 902, such as by an electronic marketplace (i.e., host, server, platform). In some embodiments, the search query is received upon a user accessing a certain page of the electronic marketplace website or upon the user making a certain selection, such as a category selection (e.g., tops, bottoms, jackets). In some embodiments, the search query can be received upon the user entering a search string in an interface of the electronic marketplace to search for relevant items. Upon receiving the search query, a set of content items are determined 904 based on the search query, such as items responsive to the search query. For example, if the search query is a selection of the "pants" category, the set of content items may include pants. At least some of the set of content items are associated with a gender score. A gender input value may also be received 906. The gender input value may be selected from a plurality of values by a user at an interface of the electronic marketplace through a selector (e.g., slider, list). The gender input value may reflect the user's gender preference, which may be a non-binary gender preference. In some embodiments, the gender input value may reflect how masculine or how feminine of a style the user is looking for. In some embodiments, the received gender input value may correspond to one or more (i.e., range) acceptable gender scores. Thus, in order to filter the set of apparel item by gender preference, the gender score of each content item is compared to the acceptable gender scores to determine 908 if the gender score of the content item is included in the acceptable gender scores. If the gender score of a content item is included in the acceptable gender scores, the content item is kept 910 in the set of content items. If the gender score of a content item is not included in the acceptable gender scores, the content item is removed 912 from the set of content items. The set of content items, which includes content items that are responsive to the search query and the gender input value, are displayed 914, for example in a user interface of the electronic marketplace. In some embodiments, when a user makes a gender input value selection, the gender input value is associated with the user or the user's account, and the gender input value can be automatically applied to a future session or search associated with the user account.

Figure 10:
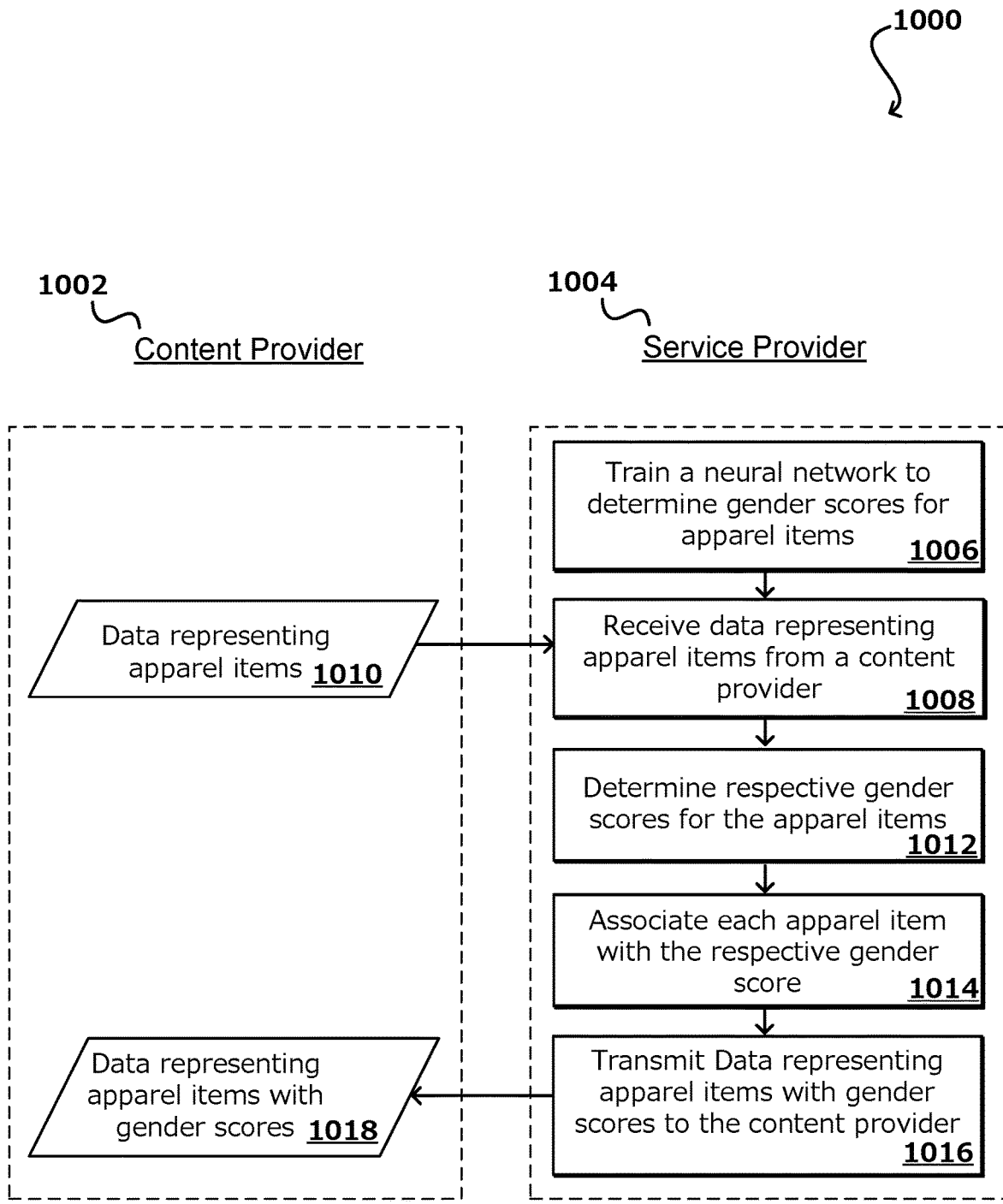
FIG. 10 illustrates an example process for refining search results that can be utilized in accordance with various embodiments.

FIG. 10 illustrates an example process 1000 of the present disclosure in which a service provider 1004 provides service enabling a third-party content provider 1002 to provide non-binary gender item filtering, in accordance with example embodiments. In this example, a neural network is trained 1006 to determine gender score for apparel items. The service provider 1004 may receive 1008 data representing apparel items 1010 from the content provider 1002. For example, the apparel items may be apparel items offered for consumption by the content provider. The content provider 1002 may be an electronic marketplace. The data may include images of the apparel items 1010 that can be analyzed by the neural network at the service provider 1004 to determine 1012 gender scores for the apparel items. Each apparel item is then associated 1014 with its respective gender score as determined by the neural network. The service provider 1004 can then transmit 1016 data representing the apparel items with gender scores 1018 to the content provider 1002. Thus, the apparel items of the content provider (i.e., electronic marketplace) are given gender scores by which the apparel items can be filtered according to a user's non-binary gender style preferences.

Although the present disclosure uses examples of a non-binary gender style scale, the techniques of the present disclosure extends to using machine learning based models to create a continuous or discrete scale between two preference points (e.g., traditionally contrasting styles) in any domain and assign queried content items to a position on said scale. For example, the present techniques may be utilized to generate a weather-based clothing scale and model. In this example, a model can be trained on "hot weather" clothing and "cold weather" clothing. By utilizing the steps discussed above, such as extracting feature vectors of the training images and mapping to a 2-dimensional scale, the model can assign a query image of an apparel item to a position of said scale. In this example, users are able to search for apparel items based on temperature. Other examples include providing a scale between "indoor" style and "outdoor" style, "vintage" style and "modern" style, among many others. Thus, the techniques presented herein can be utilized in numerous ways to create new ways in which content can be accessed and provided. Additionally, although examples discussed herein focus on images of apparel items, the techniques can be utilized with any type of content.

Figure 11:
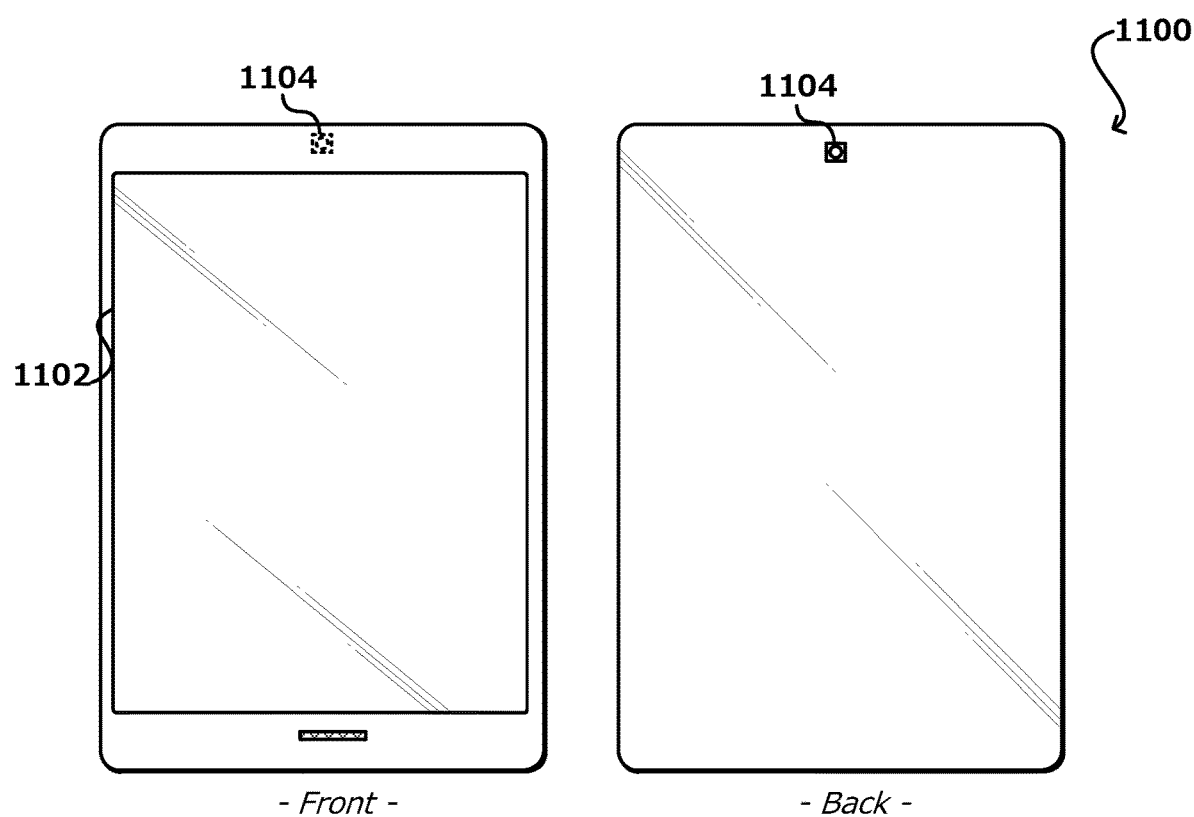
FIG. 11 illustrates an example computing device that can be utilized in accordance with various embodiments.

FIG. 11 illustrates an example of a computing device 1100 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1100 has a display screen 1102, which under normal operation will display information to a user facing the display screen (e.g., on the same side of the computing device as the display screen). The computing device in this example can include one or more media capture elements, in this example including one image capture element 1104 on the back side of the device, although it should be understood that image capture elements could also, or alternatively, be placed on the sides or corners of the device, and that there can be any appropriate number of capture elements of similar or different types. Each image capture element 1104 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 12:
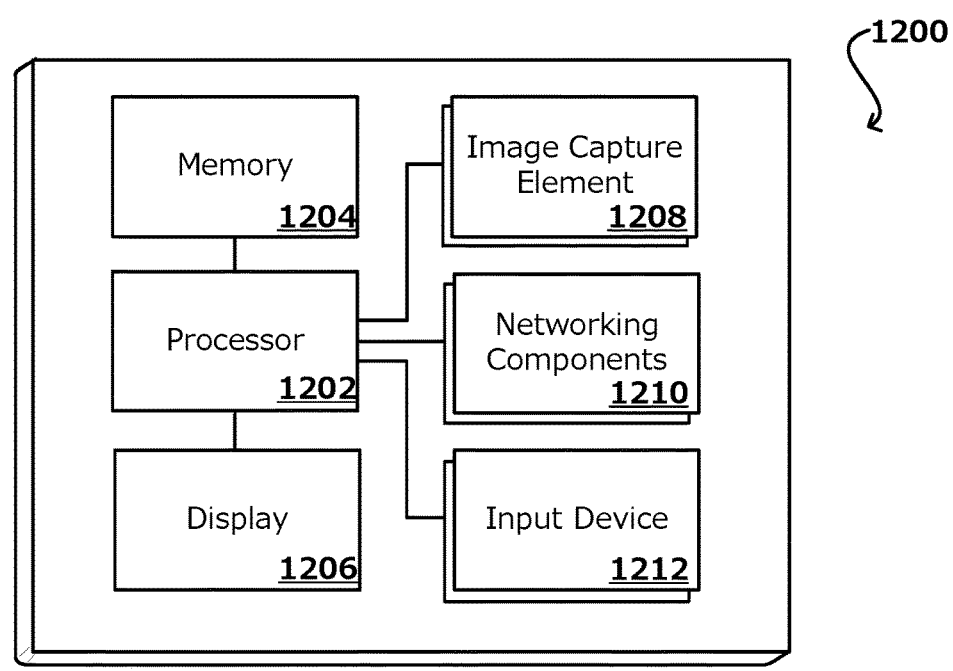
FIG. 12 illustrates example components of a computing device that can be utilized in accordance with various embodiments.

FIG. 12 illustrates a set of basic components of a computing device 1200 such as the device 1100 described with respect to FIG. 11. In this example, the device includes at least one processor 1202 for executing instructions that can be stored in a memory device or element 1204. As would be apparent to one of ordinary skill in the art, the device can include many types of memory, data storage or computer-readable media, such as a first data storage for program instructions for execution by the processor 1202, the same or separate storage can be used for images or data, a removable memory can be available for sharing information with other devices, and any number of communication approaches can be available for sharing with other devices. The device typically will include some type of display element 1206, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1208, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 1210 enabling the device to communicate with remote systems or services such as content providers and rights determining systems. These components can include, for example, wired or wireless communication components operable to communicate over a network such as a cellular network, local area network, or the Internet. The device can also include at least one additional input device 1212 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 13:
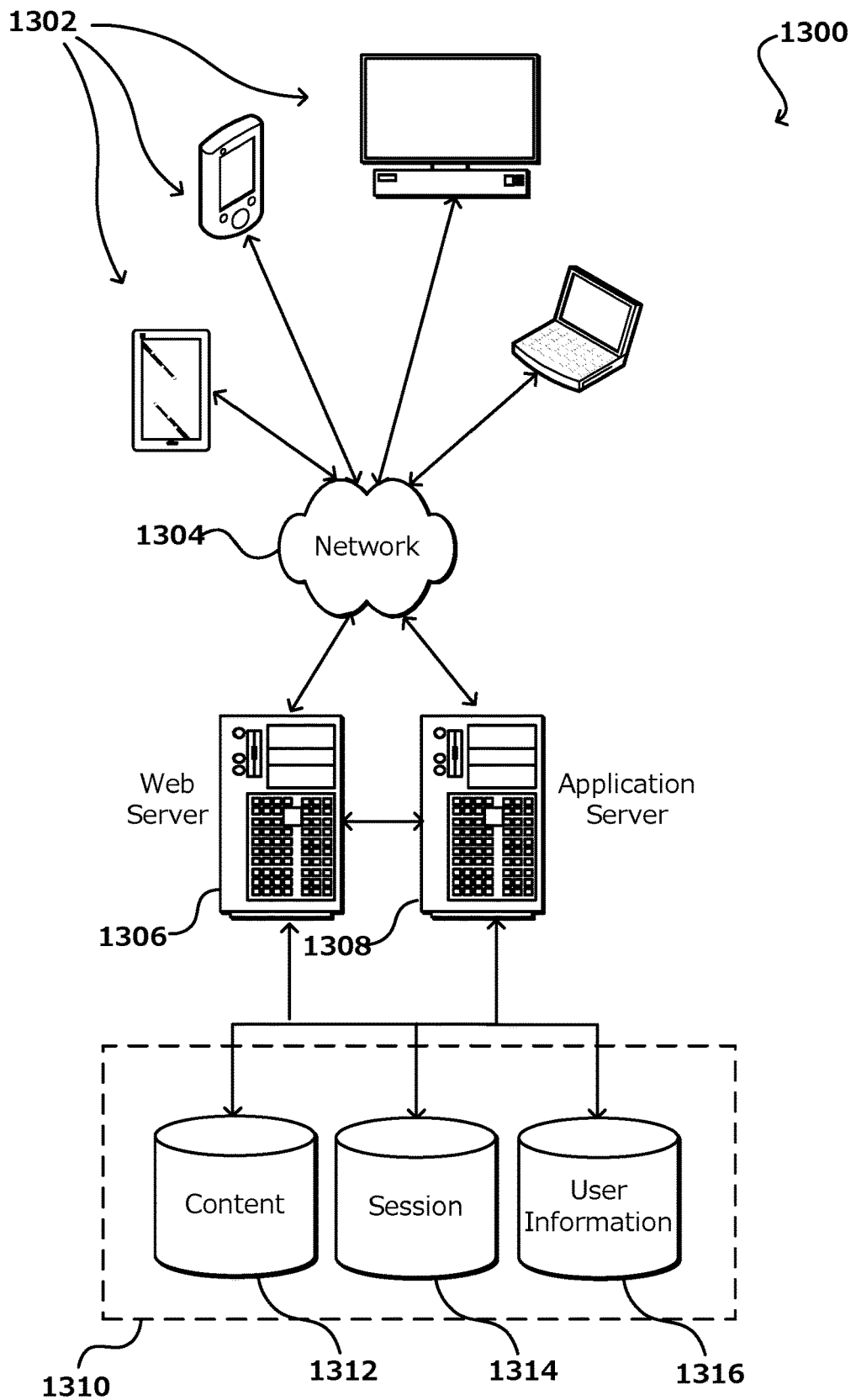
FIG. 13 illustrates an example environment for implanting aspects in accordance with various embodiments.

As discussed, different approaches can be implemented in various environments in accordance with the described embodiments. For example, FIG. 13 illustrates an example of an environment 1300 for implementing aspects in accordance with various embodiments. As will be appreciated, although a Web-based environment is used for purposes of explanation, different environments may be used, as appropriate, to implement various embodiments. The system includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1306 for receiving requests and serving content in response thereto, although for other networks, an alternative device serving a similar purpose could be used, as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1306 in the form of HTML, XML or another appropriate structured language in this example. The handling of all requests and responses, as well as the delivery of content between the client device 1302 and the application server 1308, can be handled by the Web server 1306. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing content (e.g., production data) 1312 and user information 1316, which can be used to serve content for the production side. The data store is also shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   at least one computing device processor;
   a memory device including instructions that, when executed by the at least one computing device processor, cause the computing system to:
   train a neural network using training data comprising images of a plurality of apparel items with respective gender designations to generate a trained neural network, the trained neural network operable to assign a gender score to an apparel item, the gender score corresponding to a position on a gender scale;
   assign, using the neural network, respective gender scores to a collection of apparel items offered for consumption in an electronic marketplace;
   receive an apparel search query;
   receive a gender input value, the gender input value selected from a non-binary range of values and corresponding to one or more acceptable gender scores;
   execute the apparel search query and the acceptable gender scores against the collection of apparel items; and
   determine, from the collection of apparel items, a set of apparel items responsive to the apparel search query and having gender scores included in the one or more acceptable gender scores.

2. The computing system of claim 1, wherein the instructions when executed further cause the computing system to:
   extract feature vectors associated with the training data from a layer of the neural network;
   map the feature vectors onto a 2-dimensional scale; and
   generate the gender scale based on the 2-dimensional scale.

3. The computing system of claim 1, wherein the instructions when executed further cause the computing system to:
   extract feature vectors associated with the training data from a layer of the neural network;
   identify a plurality of clusters based on the feature vectors; and
   determine a plurality of classification bins based at least in part on the plurality of clusters, the gender scale defined by the plurality of classification bins and the assigned gender score corresponding to one of the plurality of classification bins.

4. The computing system of claim 1, wherein the gender scale is defined between a masculine end and a feminine end, and the gender score reflects how masculine or feminine an apparel item is as determined by the trained neural network.

5. A computer-implemented method, comprising:
   receiving a request for a content item;
   receiving a gender input value associated with the request, the gender input value selected from a non-binary range of input values;
   executing the request against a collection of content items associated with respective gender scores on a gender scale, the respective gender scores assigned by a trained model, and the gender input value corresponding to one or more acceptable gender scores; and
   determining a set of content items, from the collection of content items, responsive to the request and having gender scores included in the one or more acceptable gender scores.

6. The computer-implemented method of claim 5, further comprising:
   training the model using training data comprising a plurality of content items with respective gender designations to generate the trained model.

7. The computer-implemented method of claim 6, wherein the respective gender designations of the training data include male and female, and the gender scale includes a plurality of values between male and female.

8. The computer-implemented method of claim 6, further comprising:
   extracting feature vectors associated with the training data; and
   generating the gender scale based on the extracted feature vectors.

9. The computer-implemented method of claim 5, further comprising:
   using the trained model to extract feature vectors associated with the collection of content items;
   mapping the feature vectors associated with the collection of content items onto the gender scale; and
   assigning the respective gender scores to the collection of content items based at least in part on the mapping of the feature vectors to the gender scale.

10. The computer-implemented method of claim 5, further comprising:
    determine a plurality of classification bins, the gender scale defined by the plurality of classification bins and the assigned gender score corresponding to one of the plurality of classification bins.

11. The computer-implemented method of claim 5, further comprising:

presenting a slider having a plurality of discrete or continuous positions, the continuous positions corresponding to the non-binary range of input values; and receiving a selected position of the slider, the selected position corresponding to the gender input value.

12. The computer-implemented method of claim 5, further comprising:

presenting a plurality of selectable images corresponding to the non-binary range of input values, the plurality of selectable images illustrating apparel items exemplifying the one or more acceptable gender scores; and receiving an image selection, the image selection corresponding to the gender input value.

13. The computer-implemented method of claim 5, further comprising:

displaying the set of content items;

receiving interaction data with a selected content item of the set of content items; and associating the selected content item with the gender input value and the interaction data as feedback data.

14. The computer-implemented method of claim 5, further comprising:

associating the gender input value with a user account; and automatically applying the gender input value to a future request associated with the user account.

15. The computer-implemented method of claim 5, further comprising:

identifying a plurality of clusters of gender scores on the gender scale and the images associated with each of the plurality of clusters;

defining a plurality of classes based at least in part on the plurality of clusters; and training a second model, using the images annotated with the respective class of the plurality of classes, to classify query images into one of the plurality of classes.

16. The computer-implemented method of claim 15, further comprising:

receiving the gender input value from the content provider; and transmitting the set of content items to the content provider.

17. A computer-implemented method, comprising:

train a neural network using training data comprising images of a plurality of apparel items with respective gender designations to generate a trained neural network, the trained neural network operable to assign a gender score to an apparel item, the gender score corresponding to a position on a gender scale;

receiving content items from a content provider;

analyzing the content items using the trained neural network;

determining gender scores for the content items using the neural network;

associating the content items with the respective gender scores; and transmitting data representing the content items with respective gender scores to the content provider.

18. The computing system of claim 17, further comprising:

receiving the images of the plurality of apparel items with respective gender designations of the training data from the content provider.

19. The computing system of claim 18, further comprising:

receiving the gender designations of the plurality of apparel items from the content provider.

20. The computing system of claim 17, further comprising:

classifying the content items into a plurality of classifications, the gender scores representing the classifications of the content items; and transmitting the classifications to the content provider.

* * * * *